United States Patent [19]

von Haartman

[11] Patent Number: 4,472,186

[45] Date of Patent: Sep. 18, 1984

[54] PH-ADJUSTING AND CHLORINE REDUCING COMPOSITION

[76] Inventor: Ernst G. E. von Haartman, Vindhemsgatan 10 A, Uppsala, Sweden, S-752 24

[21] Appl. No.: 419,428

[22] Filed: Sep. 17, 1982

[30] Foreign Application Priority Data

Sep. 28, 1981 [SE] Sweden ................................. 8105705

[51] Int. Cl.³ ................................................. C05D 1/00
[52] U.S. Cl. ........................................ 71/63; 71/64.13; 71/904; 71/DIG. 2
[58] Field of Search .................. 71/27, 64.13, 904, 63, 71/DIG. 2; 210/757

[56] References Cited

U.S. PATENT DOCUMENTS 3,003,911 10/1961 Lindstrom et al. ................... 71/904
3,186,826 6/1965 del Muroderendon ................ 71/63
3,197,302 7/1965 MacBride .............................. 71/63
3,661,953 5/1972 Carlson ............................ 71/DIG. 2
3,912,490 10/1975 Boghosian ............................. 71/63
4,174,957 11/1979 Webb et al. .......................... 71/904
4,210,437 7/1980 Windgassen et al. .................. 71/63

FOREIGN PATENT DOCUMENTS 2215634 3/1972 Fed. Rep. of Germany .......... 71/63
2537617 8/1975 Fed. Rep. of Germany .......... 71/27
5056087 10/1978 Japan ..................................... 71/63

Primary Examiner—Delbert E. Gantz
Assistant Examiner—Cynthia A. Prezlock
Attorney, Agent, or Firm—Brumbaugh, Graves, Donohue & Raymond

[57] ABSTRACT

The present invention relates to a fertilizer composition in the form of a dry dosage unit intended to be dissolved in a watering water and thereby to adjust the water with regard to its pH and chlorine content, whereby the fertilizer comprises, besides mineral nutrients, two or polyvalent acids or acid salts for pH-adjustment and a water soluble thiosulphate for the reduction of chlorine present in the water.

4 Claims, No Drawings

PH-ADJUSTING AND CHLORINE REDUCING COMPOSITION

DESCRIPTION

Technical Field

The present invention relates to a pH-adjusting and chlorine reducing composition to be used in the adjustment of feeding-water for plants, which composition preferably contains the mineral nutrients necessary for the plants.

The object of the present invention is to obtain an improved fertilizer, pH-adjusting and chlorine reducing composition which in dry form, can be added to the water used for watering of plants, and then particularly house plants.

Background of the Invention

In the cultivation of plants that method has often been used which means that one in a particular operation improves the quality of the water by eliminating the free chlorine present in the water, which chlorine derive from the purification process of the water, as well as to adjust the pH of the water possibly with a simultaneous calcium precipitation, and then in an independent step, in another water, to dispense the mineral nutrients.

It is previously known to add the fertilizer in dry form to a water intended for watering of plants, whereby the fertilizer is dissolved in the water just prior to the watering.

It is also, as indicated above, known to use pH-adjusting agents, which in the form of a solution are added to a watering water to adjust the pH to about 6.5. Such agents are preferably used in alkaline, calcium-rich water, where the pH very often exceeds 7. The adjustment is thereby carried out possibly together with calcium-precipitation.

It is also known to have chlorine-reducing agents present in liquid, pH-adjusting agents to eliminate any chlorine present in the water, which chlorine has a toxic effect on the plants. Such an agent can not include a thiosulphate as it is unstable in water, and thus should lose its effect during storage as an aqueous, liquid composition.

It has turned out that the use of different agents in different operations is regarded as too complicated, and one thus tends to add the mineral nutrients only, in dry or in liquid form, whereby bad water qualities are not compensated for, with a subsequently weak growth and even plant death as a consequence.

DESCRIPTION OF THE PRESENT INVENTION

It has now surprisingly turned out that it is possible to add both fertilizer, and chlorine reducing agent, as well as to adjust the pH in one operation by adding to the water a composition according to the present invention.

The present invention is characterized in that the composition comprises mineral nutrients in such an amount to give nutrition to the plants to which the water is added, whereby one or more of the mineral nutrients are added in the form of two or polyvalent acids or acid salts to adjust pH; 0.01–5% by weight of water soluble thiosulphate; and moreover a disintegration agent being swellable in water; and that the composition is present in the form of a dry dosage unit soluble in water.

Further characterizing parts of the invention are evident from the claims attached hereto.

The present invention will be described more in detail in the following with reference to the given, preferred Examples, however, without being restricted thereto.

EXAMPLE

First a micronutrient peparation in dry form was prepared, which was called starting material A:
12.0 g $H_3BO_3$
0.75 g $CuSO_4$
1.58 g $ZnSO_4 \times 7H_2O$
12.0 g $MnSO_4$
0.15 g $Na_2MoO_4 \times 2H_2O$
21.4 g $FeSO_4 \times 7H_2O$
74.8 g $Na_2EDTA \times 2H_2O$ The a macronutrient preparation in dry form was prepared, which was called starting material B:
48.97 g $K_2SO_4$
87.91 g $KH_2PO_4$
85.13 g $KNO_3$
2.0 g $Na_2S_2O_3$
252.0 g $NH_4NO_3$
12.2 g Starting material A
which preparation B is mixed and ground in a mill suited hereto.

EXAMPLE 1

80.0 g Starting material B
19.5 g micro-crystalline cellulose (AVICEL sold by Mont Oil)
0.5 g stearic acid The components are thoroughly mixed and tabletted in a tabletting machine to yield 100 tablets having a weight of 1 g each. The tablets are intended to be dissolved in 2 liters of water, and are thus provided with a score to be able to be readily divided into two pieces, each to be added to 1 liter of water.

The tablet dissolves very rapidly in water, whereby it has also surprisingly turned out that the micronutrients present dissolve without flocculation as they immediately form chelates at the dissolution in water.

The reason why the tablet dissolves so fast in water is that the micro-crystalline cellulose present in the tablet, absorbs water, swells, and thereby breaks the tablet, so that the water-soluble substances present will become more rapidly and more easily available for dissolution.

The composition according to EX. 1 above gives at the dissolvation in water having a normal pH a final pH of 6.5. pH can however vary somewhat depending on the pH of the ingoing water, but will be somewhere between 5.5 and 7.0, preferably 6.2–6.8. The pH-adjustment in the fertilizer is obtained by means of buffering compounds present in the composition, such as $K_2HPO_4$, $KH_2PO_4$, $Na_2HPO_4$, $NaH_2PO_4$, $H_3PO_4$, $NH_4H_2PO_4$, $(NH_4)_2HPO_4$, $H_3BO_3$, the two first mentioned being the most suitable ones.

EXAMPLE 2

40.0 g Starting material B
40.0 g potato starch
19.5 g micro-crystalline cellulose
0.5 g stearic acid The components are thoroughly mixed and are tabletted into tablets having a weight of 1 g each in accordance with Ex. 1 above. This tablet having a weight of 1 g is intended to be dissolved in 1 liter of water, whereby the pH of the water will be 6.5. pH can, as mentioned above, vary between 5.5-7.0, whereby partly the ingoing water has an influence on the final pH, partly the the amounts of buffering compounds Some waters are more acid or alkaline than others, e.g. they may have a strong alkalinity, whereby a greater buffering capacity is needed than if the alkalinity is weaker. Some plants can and will have another pH than most other plants and thus require another buffer composition.

The amount of thiosulphate has been said to be 0.01-5% by weight, but is preferably 0.1-0.5% by weight, which will take care of most occuring chlorine concentrations in standard tap water delivered in our cities. The amount of thiosulphate in the final preparation of watering water should be 0.5-5 mg/liter, whereby 1-1.5 mg/liter is a standard value. Having a water with very high concentrations of chlorine the upper value should be used to guarantee a total reduction of chlorine present.

The micronutrients and macronutrients present in a dosage unit are so selected that a suitable concentration of fertilizer is maintained in the growth medium of the plant and is present in such an amount that corresponds to the need of the plant between waterings, i.e. in such an amount that neither an impoverishment or an accumulation of nutrients is obtained, which is detrimental to the plants.

The stearic acid present in the tablet preparation above is present in order to obtain a greasing of the tablet punches during the tabletting operation and to bind the tablets together. The substance can be replaced by other substances known in the art of tabletting and for that purpose.

I claim:

1. A dry fertilizer composition which in aqueous solution provides a pH-adjusting and chlorine reducing solution for plants which comprises
   mineral nutrients wherein at least one of the nutrients is present in the form of a polyvalent acid or its salt in an amount effective to provide an aqueous solution having a pH of about 5.5 to 7.0;
   a water soluble thiosulphate in an amount of 0.1 to 0.5% by weight, and
   a disintegration agent capable of swelling in aqueous solution.

2. The fertilizer composition according to claim 1, wherein the disintegration agent is microcrystalline cellulose.

3. The fertilizer composition according to claim 1 or 2, which further comprises EDTA as a chelating agent.

4. The fertilizer composition according to claim 1 or 2, wherein the amount of the polyvalent acid or salt is 0.04 to 0.7 gram per dosage unit for one liter of solution.

* * * * *